W. P. HAMMOND.
PRESSURE GAUGE.
APPLICATION FILED JUNE 1, 1910. RENEWED NOV. 24, 1917.

1,437,516.

Patented Dec. 5, 1922.

Witnesses:
M. Miller

Inventor
William P. Hammond

Patented Dec. 5, 1922.

1,437,516

UNITED STATES PATENT OFFICE.

WILLIAM P. HAMMOND, OF PASSAIC, NEW JERSEY, ASSIGNOR TO A. SCHRADER'S SON, INCORPORATED, OF NEW YORK, N. Y., A CORPORATION OF NEW YORK.

PRESSURE GAUGE.

Application filed June 1, 1910, Serial No. 564,502. Renewed November 24, 1917. Serial No. 203,863.

*To all whom it may concern:*

Be it known that I, WILLIAM P. HAMMOND, a citizen of the United States, and a resident of the city and county of Passaic, and State of New Jersey, have invented certain new and useful Improvements in Pressure Gauges, of which the following, taken in connection with the accompanying drawings, is a clear, concise, and complete description thereof.

My invention comprehends certain improvements in pressure gauges particularly designed for use in measuring the fluid pressure in pneumatic tires and the object of my invention is to provide an improved construction of gauge adapted for momentary application to the valve of a pneumatic tire that will indicate the fluid pressure within the tire and maintain such indication after the gauge has been removed from the tire valve and until the tension on the spring has been released. A further object of my invention is to provide means for releasing an excess pressure from within the tire, while the gauge is applied to the tire valve and withall to provide a gauge that is air tight, simple in construction and inexpensive in cost of manufacture.

To the accomplishment of these as well as other objects which will manifest themselves from a reading of the following specification, I will proceed to describe one preferable embodiment of my invention particularly adaptable to pneumatic tires which I have illustrated in the accompanying drawings with the understanding that I do not hereby restrict myself to this illustrated and described embodiment of the broad features thereof to its use in connection with pneumatic tires or in fact with any other fluid pressure receiving and containing structures.

Referring to the drawings.

Figure 1:
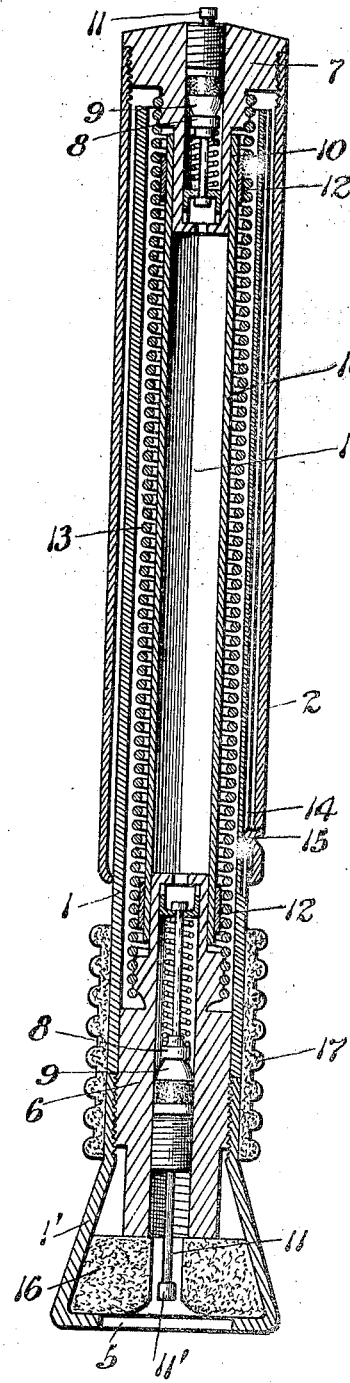
Fig. 1 is a sectional view of a gauge embodying the broad features of my invention.
Figure 2:
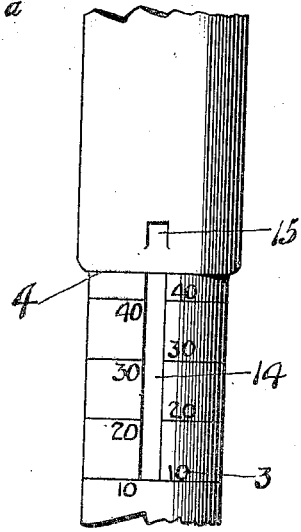
Fig. 2 is a detail showing the indicating means.

The gauge as illustrated comprises two shells 1 and 2 telescopically mounted with relation to one another, the outer shell moving under fluid pressure to expose a scale or graduation 3 provided on the periphery of the inner shell 1 and indicated by the registration of the edge 4 of said outer shell with said graduation the degree of such pressure in pounds pressure per square inch. The inner shell 1 is preferably made in two sections, the lower section indicated at 1' being conoidal as shown and adapted to abut the edge of the upper section and be held in sustaining engagement by other parts of the device. The lower section 1' is provided with an aperture 5 for the reception of the valve casing of a tire when applying the gauge thereto. A valve housing 6 in which is mounted a valve mechanism is located within the shell 1, being preferably screwed therein. The housing 6 projects within the section 1 of the inner shell and has a close wedged or driven connection therewith. The upper end of the outer shell 2 is provided with screw threads and mounted and projecting therein is a similar housing which is also provided with a valve mechanism. As these valve mechanisms are alike in construction, the description of one will suffice to a clear understanding thereof. The valve mechanism illustrated is of well known construction and consists of a valve head 8 which is yieldingly held to a valve seat 9 by a coil spring and which has a stem 11 that protrudes beyond the outer end of the housing in which it is mounted, so that pressure upon the protruding end of the stem will cause the valve 8 to be moved from its seat to permit the passage of fluid to or from the gauge as the case may be according to which valve is operated.

The housings 6 and 7 are connected by an elastic tube 10 the interior of which forms a pressure chamber 11ª, the tube 10 being clamped to the housings by means of a ring or clamp 12. Surrounding the tube 10 and suitably fastened to the housings 6 and 7 is a spring 13 shown here as being of the expansion type. This spring is accurately calibered to the desired measurements to cause the shells 1 and 2 to indicate the pressure of the fluid being tested.

A groove 14 is provided in the shell 1 as a guide for the reception of a lug 15 punched out of the outer shell 2 to prevent rotary movement of the shells and disarrangement of the parts.

At the valve engaging end of the gauge and within the conodial portion 1' of the shell is provided a rubber bushing 16 serving as a seat against which the valve casing of the tire rests and by means of which an air tight connection is established. A corrugated rubber sleeve 17 is provided on the device to afford a good gripping surface for the hand of the operator or user.

Both valve stems are provided with enlarged heads or ends, the end 11' of the lower valve engages the stem of a similar valve in the valve casing of the tire being tested, depressing the same, as well as lifting itself and the valve in the operation in order that the fluid pressure within the tire may be admitted to the pressure chamber 11ª of the gauge and there operate the gauge by expanding the spring and moving the shell 2 to expose the scale and thus indicate the degree of such fluid pressure.

It will be apparent that upon the removal of the gauge from the tire valve casing that the valve mechanism in the lower housing 6 will close immediately under the influence of its own spring as well as the pressure of the fluid behind it within the pressure chamber, this pressure being thereby trapped within the gauge and the indication on the scale is made permanent and maintained until the pressure is released. This affords an opportunity for testing tires in the dark, as it is possible to apply the gauge to the tire and remove it to a light for inspection or reading and when used in daylight it affords a great convenience as it does not require bending down low in order to read the scale as is now necessary with other similar devices.

To release the tension on the spring 13 in order to reset the gauge, the valve stem 11' of the upper valve is depressed, the air pressure thereby escaping and the spring and elastic tube will contract to initial position and the gauge is then ready for another test.

In testing tire pressures should it be found that too much fluid pressure is within as indicated by the gauge scale, by depressing the valve stem 11 of the upper valve the excess fluid pressure may be released from the tire through the gauge, the valve stem 11 being released as soon as the desired proper pressure is indicated on the gauge.

The operation of the device is thought to be apparent from the foregoing description. The gauge is applied to the valve casing of the tire to be tested, the rubber bushing 16 engaging the edge of the valve casing and serving to form a seal or air-tight connection between the said casing and the gauge. In applying the valve to the casing, the enlarged head 11' of the valve stem will engage and depress the valve stem in the valve casing of the tire, and at the same time the valve 8 will be lifted from its seat, thereby establishing open communication between the interior of the tire and the interior of the pressure chamber 11ª of the gauge. The fluid thus admitted to the gauge will expand the extensible tube 10 and the spring 13, thereby moving the housing 7 and index shell 2 outwardly so as to expose the graduations on the shell 1. After being thus momentarily applied to the tire, the gauge is removed therefrom, the valve 8 together with the valve of the tire automatically closing under the action of their respective springs. In this manner air is trapped within the chamber 11ª and the pressure indication maintained so as to permit of the gauge being inspected in a manner most convenient to the user. In order to reset the gauge after a reading has been made, the enlarged head of stem 11 of the upper valve 8 is depressed so as to relieve the pressure within the chamber 11ª.

When testing, should the pressure be found to be excessive in the tire, the same may be reduced by depressing the enlarged head of stem 11 to unseat the valve 8 of the upper valve of the gauge and allowing a portion of the fluid to escape. When the proper pressure is thus obtained, the enlarged head of stem 11 will be released so as to permit the valve to close, the desired pressure being then indicated upon the scale.

It is manifest that changes may be made in the detail structural arrangement of the gauge and equivalent means substituted without departing from the scope and tenor of the appended claims, as, for instance, I may use other means for holding the spring in suspension to maintain the indication on the gauge and I do not wish to be unduly restricted in the matter of equivalents.

I do not herein claim the broad invention of a gauge with a press-on foot, which has means for holding the indicator in pressure-indicating position after the gauge is removed from the tire valve, since this forms the subject-matter of the prior application of Robert Faries, Serial No. 543,222, filed February 11, 1910.

Having thus described my invention, what I claim as new herein and desire to secure by Letters Patent is:

1. A pressure gauge for pneumatic tires, comprising a pressure-responsive element, means for temporarily connecting said pressure-responsive element with the interior of a tire through a tire-valve, said connection having a single passage therethrough leading to said pressure-responsive element, a valve in said passage adapted to trap air admitted to said pressure-responsive element, and a second valve adapted to be manually operated for releasing the air trapped in said pressure-responsive element.

2. A portable pressure gauge for pneumatic tires and the like, said pressure gauge being formed with a pressure chamber and a seat communicating with the pressure chamber and adapted to engage the valve casing of a tire valve, a check valve for admitting fluid pressure to the pressure chamber and automatically trapping it therein so that a reading can be made after the gauge has been removed from the tire, means for automatically opening the tire valve when the seat is applied thereto and a manually operated valve for releasing the pressure from the pressure chamber to reset the gauge, said last named valve having a projecting valve stem.

3. A portable pressure gauge for pneumatic tires and the like, said pressure gauge being formed with a pressure chamber and also with a seat communicating with the pressure chamber and adapted to engage the valve casing of a tire valve, an inwardly opening spring seated check valve for admitting fluid pressure to the pressure chamber and automatically trapping it therein so that a reading can be made after the gauge has been removed from the tire, a stem projecting from the check valve and adapted to engage the tire valve to automatically open the same when the pressure gauge is applied to the valve casing of the tire valve, and a resiliently seated valve for releasing the pressure from the pressure chamber to reset the gauge, said latter valve at the end of the pressure chamber opposite the first mentioned valve.

4. A portable pressure gauge for pneumatic tires and the like, said pressure gauge including telescoping gauge members one of which is formed with a seat adapted to engage the valve casing of a tire valve, an elastic tube connecting the gauge members and cooperating therewith to provide a pressure chamber which is in communication with the seat, a coil spring surrounding the elastic tube and connecting the gauge members, means for opening the tire valve when the gauge is applied thereto, a check valve for admitting fluid pressure to the pressure chamber and automatically trapping it therein so that a reading can be made after the gauge has been removed from the tire, and a release valve for resetting the gauge.

5. A pressure gauge for pneumatic tires comprising a casing, a pressure-responsive element within said casing, means carried by said casing for temporarily connecting said pressure-responsive element with the interior of a tire through a tire valve, said connection having a single passage therethrough leading to said pressure-responsive element within the casing, a valve in said passage adapted to trap air admitted to said pressure-responsive element, and a manually-operable part having a portion located at the exterior of said casing for releasing the trapped air.

WILLIAM P. HAMMOND.

Witnesses:
E. T. COCKEY,
M. MILLER.